United States Patent
Maass et al.

(10) Patent No.: US 9,938,144 B2
(45) Date of Patent: Apr. 10, 2018

(54) PROCESS FOR PRODUCING SYNTHESIS GAS AND ELECTRICAL ENERGY

(71) Applicants: LINDE AKTIENGESELLSCHAFT, Munich (DE); BASF SE, Ludwigshafen (DE)

(72) Inventors: Hans-Jurgen Maass, Dresden (DE); Otto Machhammer, Mannheim (DE); Andreas Bode, Mannheim (DE); Grigorios Kolios, Neustadt (DE)

(73) Assignee: BASF SE, Ludwigshafen (DE)

( * ) Notice: Subject to any disclaimer, the term of this patent is extended or adjusted under 35 U.S.C. 154(b) by 159 days.

(21) Appl. No.: 14/827,496

(22) Filed: Aug. 17, 2015

(65) Prior Publication Data
US 2016/0052785 A1    Feb. 25, 2016

(30) Foreign Application Priority Data
Aug. 19, 2014 (EP) .................................... 14002871

(51) Int. Cl.
$C01B\ 3/30$     (2006.01)
$C01B\ 31/18$    (2006.01)
(Continued)

(52) U.S. Cl.
CPC ................. $C01B\ 3/30$ (2013.01); $C01B\ 3/24$ (2013.01); $C01B\ 3/28$ (2013.01); $C01B\ 31/18$ (2013.01);
(Continued)

(58) Field of Classification Search
CPC combination set(s) only.
See application file for complete search history.

(56) References Cited

U.S. PATENT DOCUMENTS 6,641,625 B1 * 11/2003 Clawson ................ B01J 8/0419
                                                                422/187
2006/0130647 A1 * 6/2006 Dunn ..................... C01B 3/501
                                                                 95/45
(Continued)

FOREIGN PATENT DOCUMENTS

DE      102011106642 A1    1/2013
DE      102011106645 A1    1/2013
(Continued)

OTHER PUBLICATIONS

Search Report dated Feb. 11, 2015 issued in corresponding application EP 14002871.3 (pp. 1-2).
(Continued)

*Primary Examiner* — Imran Akram
(74) *Attorney, Agent, or Firm* — Millen White Zelano & Branigan, PC

(57) ABSTRACT

The invention relates to a process for producing synthesis gas, in which carbon and hydrogen are obtained from hydrocarbon by thermal decomposition. At least a portion of the carbon obtained by the thermal decomposition is reacted, and at least a portion of the hydrogen obtained is reacted with carbon dioxide by a reverse water-gas shift reaction to give carbon monoxide and water. Carbon obtained by the thermal hydrocarbon decomposition is used as fuel in a power plant operation wherein the carbon is combusted to produce electrical power, and carbon dioxide formed in the combustion of the carbon is used in the reverse water-gas shift reaction.

15 Claims, 1 Drawing Sheet

(51) Int. Cl.
*C01B 3/24* (2006.01)
*C01B 3/28* (2006.01)
*C10J 3/18* (2006.01)
*C10J 3/20* (2006.01)
*C10K 3/02* (2006.01)

(52) U.S. Cl.
CPC . *C10J 3/18* (2013.01); *C10J 3/20* (2013.01); *C10K 3/026* (2013.01); *C01B 2203/0216* (2013.01); *C01B 2203/0272* (2013.01); *C01B 2203/061* (2013.01); *C01B 2203/062* (2013.01); *C01B 2203/085* (2013.01); *C01B 2203/0822* (2013.01); *C01B 2203/0838* (2013.01); *C01B 2203/1235* (2013.01); *C01B 2203/148* (2013.01); *C01B 2203/84* (2013.01); *Y02P 20/128* (2015.11); *Y02P 20/129* (2015.11); *Y02P 20/146* (2015.11)

(56) References Cited

U.S. PATENT DOCUMENTS

| | | |
|---|---|---|
| 2012/0241676 A1 | 9/2012 | Kim et al. |
| 2014/0127121 A1 | 5/2014 | Maass et al. |
| 2014/0217327 A1 | 8/2014 | Mass et al. |
| 2014/0288195 A1* | 9/2014 | Castelli .................... C10K 3/00 518/700 |
| 2015/0336795 A1* | 11/2015 | Kern ....................... C01B 31/18 252/373 |
| 2016/0186069 A1* | 6/2016 | Bashir ..................... C10K 3/06 518/704 |

FOREIGN PATENT DOCUMENTS

| | | |
|---|---|---|
| DE | 102013021418 A1 | 6/2014 |
| WO | 2014097142 A1 | 6/2014 |

OTHER PUBLICATIONS

M. Haghighi, et al., "On the reaction mechanism of C02 reforming of methane over a bed of coal char", Proceedings of the Combustion Institute, vol. 31, No. 2 (Dec. 2006) pp. 1983-1990.

* cited by examiner

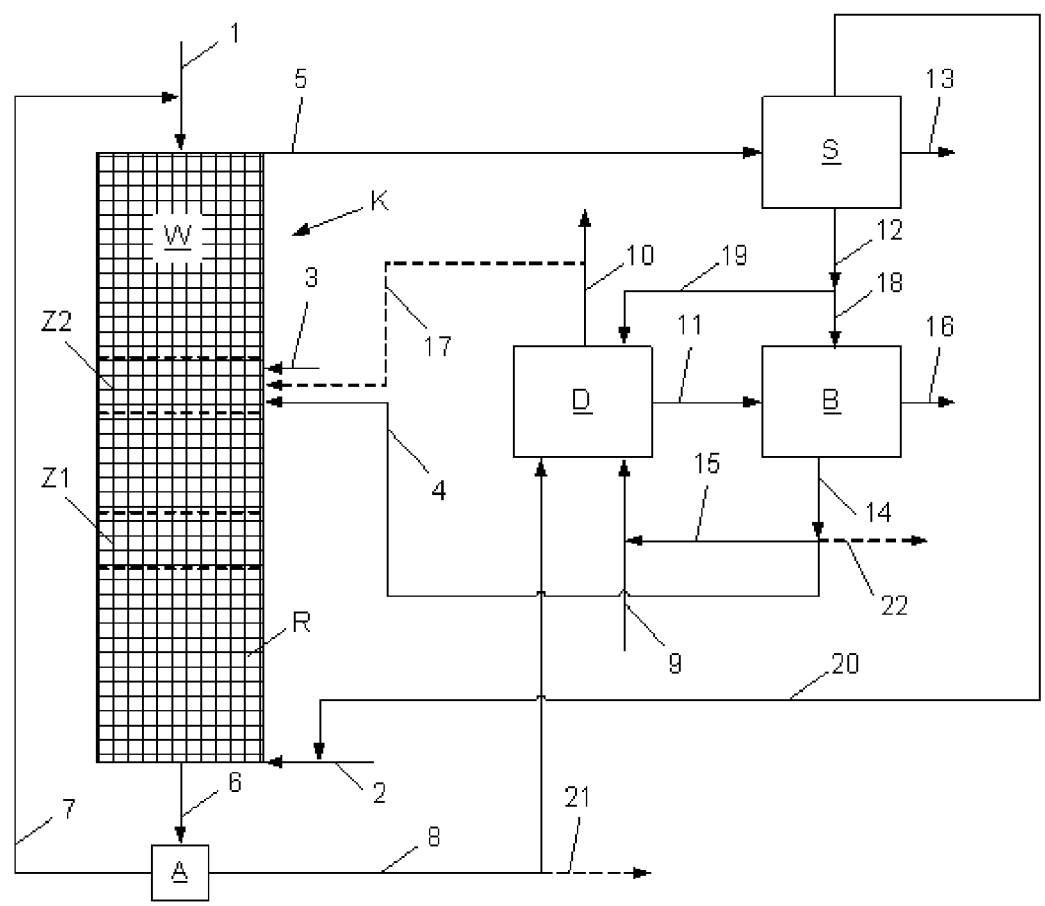

PROCESS FOR PRODUCING SYNTHESIS GAS AND ELECTRICAL ENERGY

The invention relates to a process for producing synthesis gas, in which carbon and hydrogen are obtained from a hydrocarbon feedstock by thermal decomposition, by oxidizing at least a portion of the carbon obtained and reacting at least a portion of the hydrogen obtained with carbon dioxide by a reverse water-gas shift reaction to give carbon monoxide and water.

Synthesis gas is understood to mean a gas mixture which comprises hydrogen and carbon monoxide and can be used as a commodity chemical in a multitude of industrial processes. Depending on their use, synthesis gases have different ratios of hydrogen to carbon monoxide.

A process of the same generic type is known from international patent application WO2014/097142, which suggests passing the hydrogen formed in the first reaction zone at a temperature between 800 and 1400° C. into a second reaction zone, in order to utilize the heat content thereof for the conversion of hydrogen and carbon monoxide by reverse water-gas shift reaction to water and carbon monoxide. The application envisages release of the carbon obtained in the hydrocarbon decomposition as a product which is used and oxidized, for example, for metallurgical purposes as injection coal, coking coal additive or blast furnace coke. The process allows production of synthesis gas substantially without release of climatically harmful carbon dioxide into the atmosphere, since there is a rough balance between levels of carbon dioxide formed in providing the heat of reaction and supplied as feedstock. Because of the large number and amount of substances that are difficult to remove in the gas mixtures that arise in the suggested use of the carbon, the carbon dioxide can be obtained only with considerable difficulty and at high cost in a form that would allow its physical utilization or sequestration. Therefore, carbon dioxide gas will get into the atmosphere at least when the carbon product is used as proposed for metallurgical purposes.

It is an object of the present invention to specify a process of the same generic type which can overcome the disadvantages of the prior art and which especially allows the production of synthesis gas with no release of carbon dioxide into the atmosphere, or at least with a much smaller release than is possible according to the prior art.

Upon further study of the specification and appended claims, other objects, aspects and advantages of the invention will become apparent.

These objects are achieved by using carbon obtained by the thermal hydrocarbon decomposition as fuel in a power plant operation in order to produce electrical power, and using carbon dioxide formed in the combustion of the carbon in the reverse water-gas shift reaction.

In the performance of the process according to the invention, the carbon obtained in the hydrocarbon decomposition is burnt, for example, in the combustion chamber of the boiler of a hard coal or brown coal power plant at the pressures and temperatures that are typical of such power plants, in order to produce high-pressure steam which is subsequently exhausted in a turbine coupled to a power generator. In order to compensate for any higher calorific value of the carbon produced in accordance with the invention as compared with hard coal or brown coal, it is proposed that carbon dioxide be separated from the carbon dioxide-containing gas mixture obtained in the carbon combustion and recycled into the combustion chamber.

According to whether the carbon obtained by thermal hydrocarbon decomposition is combusted alone or together with another fuel, for example hard coal or brown coal, a carbon dioxide-containing gas mixture is formed with a greater or lesser proportion of substances, for instance sulphur compounds, which would have an unfavorable effect on the course of the reverse water-gas shift reaction or would contaminate the synthesis gas produced. It is therefore necessary to separate these substances from the carbon dioxide-containing gas mixture in order to be able to use the carbon dioxide obtained in the reverse water-gas shift reaction. Preferably, the carbon dioxide-containing gas mixture, for this purpose, is subjected to a chemical and/or physical gas scrubbing operation as known from the prior art. Particular mention should be made here of amine scrubbing in which ethanolamine derivatives are used preferentially as scrubbing agents. If exclusively a sulphur-free, hydrocarbon-containing feedstock is used for the carbon production, for example desulphurized natural gas, the carbon obtained also contains only very small amounts of sulphur, if any, and so a virtually sulphur-free carbon dioxide-containing gas is obtained in the burning operation and it is possible to dispense with a desulphurization stage in the gas scrubbing. If such a fuel is combusted in an oxyfuel process with an oxidizing agent consisting of oxygen and carbon monoxide, the flue gas formed consists virtually exclusively of carbon dioxide, and so it may be possible to entirely dispense with a gas scrubbing operation.

The process according to the invention enables synthesis gas production in which carbon dioxide is circulated and not released into the atmosphere. Depending especially on the manner of provision of the thermal energy required, the total amount of carbon dioxide produced can be consumed again in the operation. Excess carbon dioxide can be provided as carbon source for other carbon-consuming operations. It is also conceivable to operate the process in such a way that more carbon dioxide is consumed than generated. In this case, carbon dioxide has to be fed in from outside, as a result of which the operation acts as a carbon dioxide sink.

The hydrocarbon feedstock, which is, for example, methane, ethane, propane or butane, or combinations thereof, is fed to the hydrocarbon decomposition advantageously in the form of a hydrocarbonaceous gas. Preferably, the hydrocarbonaceous gas used is natural gas having a methane content, depending on the natural gas deposits and the manner of processing, typically between 75 and 99 mol %.

The synthesis gas production according to the invention can be performed at ambient pressure or under pressure. It is preferably effected at pressures between 10 and 25 bar, and more preferably—allowing for pressure drops—at the highest pressure under which a feedstock comprising hydrocarbons is available for the carbon production. This may, for example, be the pressure under which natural gas can be drawn as input from a natural gas grid.

Thermal energy required for the synthesis gas production according to the invention can be generated, for example, by oxidation or partial oxidation of a fuel comprising hydrocarbons and/or hydrogen. Oxidizing agents used are, for example, air and/or oxygen-enriched air and/or oxygen of technical grade purity. Oxidation and partial oxidation can be conducted outside a reaction zone in which the thermal hydrocarbon decomposition and/or the reverse water-gas shift reaction are being conducted, for which purpose the fuel is mixed with an oxidizing agent and reacted. The hot gas formed is subsequently introduced into the reaction zone, wherein it releases a portion of its tangible heat directly or indirectly to the substances to be converted.

However, the oxidizing agent can also be introduced into the reaction zone, mixed therein with a fuel present, which is hydrogen obtained by the hydrocarbon decomposition, and reacted.

Alternatively or additionally to the oxidative methods described, thermal energy can also be generated by means of electrical power and provided for the synthesis gas production according to the invention. For this purpose, for example, one or more electrically conductive heating elements may be arranged in a reaction zone such that they become thermally connected directly or indirectly to the substances to be converted. An electrical conductive heating element is disposed either in fixed or mobile form within the reaction zone. For example, the heating element may be part of a moving bed or fluidized bed composed of a granular, electrically conductive solid comprising carbon, for example, which is passed through the reaction zone.

In order to heat it, an electrically conductive heating element is connected to a power source which is used to pass electrical power through the heating element. A possible alternative is to generate heat through electromagnetic induction. For this purpose, an induction coil which provides an alternating magnetic field as soon as an electrical AC voltage is applied thereto is disposed outside the two reaction zones. An electrically conductive heating element electrically insulated from the induction coil is arranged in such a way that the alternating magnetic field can induce eddy currents therein, which lead to heating of the heating element because of the ohmic losses. If the heating element consists of a ferromagnetic material, for example an iron-silicon or iron-nickel alloy or $\mu$ metal, core losses additionally contribute to heating of the heating element and hence to the formation of a temperature gradient between a heating element and its environment.

The preferred variant of the process according to the invention envisages using power which is generated using carbon obtained by thermal carbon decomposition for providing thermal energy for the synthesis gas production. However, it is sensible to employ this course of action only when the power can be released to the public power grid only under unfavorable conditions, if at all, and so the amount of power provided for the synthesis gas production is subject to significant variation with time. Thermal energy is therefore also produced in another way, more particularly by an oxidative route, and supplied to the synthesis gas production with a power varying with time, such that the total amount of thermal energy available for the conversion of the hydrocarbon feedstock always meets or approaches a target value. This process variant makes it possible to operate the synthesis gas production and the power plant operation always under optimal conditions with a power close to the particular capacity, and nevertheless to release the power generated to the public grid in a flexible manner and with high addition of value.

Depending on the way in which the thermal energy required for the synthesis gas production is provided, different mass balances arise. In order, however, to be able to always operate both the thermal hydrocarbon decomposition and the oxidation of the hydrocarbons and the scrubbing of the carbon dioxide-containing gas mixture produced under constant conditions, it is proposed that carbon not utilizable in the operation at that time and non-utilizable carbon dioxide be stored intermediately and be fed back to the operation as required. Preferably, carbon dioxide is stored intermediately here in liquid form.

It is additionally proposed that carbon not utilizable in the operation not just at that time but at any time be released to users as raw materials. For example, the carbon can be used for metallurgical purposes as injection coal, coking coal additive or blast furnace coke.

The synthesis gas produced in accordance with the invention can be released to an external user as product for a credit note. However, it is preferably converted to a material of value, for example methanol and/or dimethyl ether and/or hydrocarbons. Appropriately, the particular conversion step is integrated into the overall process in terms of energy. If the synthesis gas, for example, is converted to hydrocarbons by the Fischer-Tropsch process, the waste heat obtained here can be used to heat a chemical scrubbing operation in which the carbon dioxide-containing gas mixture obtained in the carbon combustion is processed, in order to obtain carbon dioxide for the reverse water-gas shift reaction. Alternatively or additionally, the waste heat can also be used to generate steam which is used, for example, in the power plant operation for power production.

A stream which comprises hydrocarbons and is obtained in the conversion of the synthesis gas, for example the offgas of a Fischer-Tropsch process, is preferably recycled and, optionally after a purification step, fed to the thermal hydrocarbon decomposition.

Compared to the prior art, the process according to the invention enables production of products from synthesis gas with a much smaller "carbon footprint", the latter being a statement of the total amount of carbon dioxide released into the atmosphere directly or indirectly in the production process, for instance in the production, processing and transport of the hydrocarbons used. For example, the footprint is reduced in the production of Fischer-Tropsch products from natural gas from 4 to less than 2 $t_{CO2}/t$.

In a further development of the process according to the invention, it is proposed that the thermal hydrocarbon decomposition be conducted in a first reaction zone and hydrogen formed be passed out of the first reaction zone into a second reaction zone in order to be reacted therein with carbon dioxide by reverse water-gas shift reaction to give water and carbon monoxide. Preferably, energy required for the thermal hydrocarbon decomposition here is fed to the first reaction zone from the second reaction zone.

In this way, it is possible to conduct the thermal hydrocarbon decomposition that proceeds in the first reaction zone substantially independently from the other reactions and hence to have comparatively simple and good controllability thereof. Temperature is the primary means, for example, of adjusting the ratio of decomposed to undecomposed hydrocarbon and hence in particular of controlling the amount of hydrogen produced in the first reaction zone. Thus, at a temperature of about 800° C., only about half of the hydrocarbons used is decomposed, whereas full conversion takes place at about 1200° C.

In order to react hydrogen with carbon dioxide by a reverse water-gas shift reaction to water and carbon monoxide, higher temperatures are generally needed than for the thermal hydrocarbon decomposition, such that a temperature gradient can be established between the second and first reaction zones, and this is appropriately utilized in order to supply energy required for the thermal hydrocarbon decomposition to the first reaction zone in the form of heat. Preferably, all the energy required for the thermal hydrocarbon decomposition is supplied to the first reaction zone from the second reaction zone.

Depending on the reaction conditions, in the performance of the process according to the invention, only a portion of the hydrocarbon is decomposed in the first reaction zone to hydrogen and carbon, which means that undecomposed or incompletely decomposed hydrocarbon can be drawn off from the first reaction zone. A particularly preferred configuration of the process according to the invention envisages passing undecomposed or incompletely decomposed hydrocarbon from the first reaction zone into the second reaction zone and reacting it therein with water by steam reforming to give hydrogen and carbon dioxide. Appropriately, the water required for the reaction is water which is obtained in the second reaction zone by the reaction of hydrogen with oxygen and/or carbon dioxide. However, there is no intention to rule out supply of water from the outside.

An appropriate configuration of the process according to the invention envisages conducting the thermal hydrocarbon decomposition in the presence of a solid granular material. Under this condition, carbon formed in the first reaction zone is not a problem, since it can be deposited on the solid granular material and optionally removed from the first reaction zone together therewith. The solid granular material acts as a filter, and so it is possible to draw off hydrogen formed in particular, but also other gases, from the first reaction zone substantially free from carbon particles, and to conduct it, for example, into the second reaction zone. Carbon which gets into the second reaction zone in spite of the filter reaction described reacts with the oxygen present therein to give a carbon oxide which forms part of the synthesis gas directly or after the reverse water-gas shift reaction.

Preferably, the solid granular material is conducted through the first reaction zone as a moving bed, appropriately with passage of the hydrocarbon feedstock to be converted in countercurrent to the granular material. For this purpose, it is sensible for the first reaction zone to be arranged in a reaction space configured as a vertical shaft, such that the movement of the moving bed arises under the action of gravity alone. However, the solid granular material can also be conducted through the first reaction zone in the form of a fluidized bed. Both variants allow a continuous or quasi-continuous mode of operation.

Advantageously, the reactions which proceed in the second reaction zone are also conducted in the presence of a solid granular material which is preferably conducted through the reaction zone as a moving bed. Preferably, the first and second reaction zones are connected by means of a moving bed consisting of solid granular material, which completely encompasses the two reaction zones and moves from the second to the first reaction zone. For this purpose, it is sensible for the two reaction zones to be arranged together, one on top of another in a reaction space configured as a vertical shaft, such that the movement of the moving bed arises under the action of gravity alone. The connection of the two reaction zones via the moving bed allows use of the solid granular material as a heat transfer agent with which heat is transported from the second reaction zone to the first.

If the solid granular material is conducted through the two reaction zones as a moving bed, a further preferred variant of the process according to the invention envisages introducing the solid material into the reaction space at ambient temperature, first heating it up to the maximum temperature of the second reaction zone therein and then transferring it into the first reaction zone, where it provides a portion of its heat for the reactions that proceed therein and is cooled at the same time. After leaving the first reaction zone, it is cooled down further, appropriately to close to ambient temperature, such that no cooling or quenching of the solid granular material drawn off from the reaction space is required. To form and maintain the temperature profile described, it is proposed that a hydrocarbon-containing gas mixture at ambient temperature be introduced into the reaction space and conducted through the moving bed in countercurrent. On its way through the reaction space, the gas mixture exchanges heat with the moving bed by direct contact. As a result, by the time it reaches the first reaction zone, the gas mixture is heated to more than 1200° C., and simultaneously the moving bed is cooled. Gas flowing out of the first reaction zone is conducted further in countercurrent through the moving bed to the second reaction zone whereby the gas is heated up by direct heat exchange with the moving bed. The hot gases flowing out of the second reaction zone are cooled by direct heat exchange with the moving bed, such that they can be drawn off from the reaction space at a temperature between 50 and 500° C.

For performance of the process according to the invention, the solid granular material used may be a granular material made of corundum ($Al_2O_3$), quartz glass ($SiO_2$), mullite ($Al_2O_3.SiO_2$), cordierite (($Mg,Fe)_2(Al_2Si)$ $[Al_2Si_4O_{18}]$), steatite ($SiO_2.MgO.Al_2O_3$), or combinations thereof. Preference is given, however, to using a carbon-rich granular material formed from solid grains consisting entirely or predominantly of carbon, and having at least 50% by weight, preferably at least 80% by weight, further preferably at least 90% by weight of carbon, further preferably at least 95% by weight, especially at least 98% by weight of carbon. The grains are advantageously present with an equivalent diameter, which can be determined by sieving with a particular mesh size, of 0.05 to 100 mm, preferably of 0.05 to 50 mm, further preferably 0.05 to 10 mm, further preferably 0.1 to 3 mm, further preferably 0.2 to 2 mm, especially 0.3 to 1 mm.

Advantageously, the density of the solid granular material is 0.15 to 2.25 g/ml, preferably 0.3 to 2 g/ml, further preferably 0.65 to 1.85 g/ml, especially 0.9 to 1.7 g/ml.

Advantageously, the porosity of the solid granular material is 0 to 0.95 ml/ml, preferably 0.1 to 0.85 ml/ml, further preferably 0.15 to 0.7 ml/ml, especially 0.25 to 0.6 ml/ml.

Advantageously, the solid granular material is macroporous. The mean pore radius is advantageously 0.01 to 50 µm, preferably 0.1 to 20 µm, especially 0.5 to 5 µm. The specific surface area is advantageously 0.02 to 100 $m^2$/g, preferably 0.05 to 10 $m^2$/g, especially 0.2 to 2 $m^2$/g.

The solid granular material is advantageously spherical. In the process according to the invention, it is possible to use a multitude of different carbon-containing granular materials. A granular material of this type may, for example, consist predominantly of coal, coke, coke breeze and/or mixtures thereof. In addition, the carbon-containing granular material may contain 0% to 15% by weight, based on the total mass of the granular material, preferably 0% to 5% by weight, of metal, metal oxide and/or ceramic.

A granular material of this type may consist, for example, entirely or partly of coke breeze unsuitable for use in a blast furnace because of its small particle size. Conceivable alternatives are granular materials consisting wholly or partly of low-grade coking plant coke based on brown coal or hard coal and/or of coke obtained from biomass. Preferably, the granular material consists of carbon which is produced in the process by thermal hydrocarbon decomposition and is circulated.

"Coke" in the present invention is understood to mean a porous fuel having a high carbon content (proportion by mass of C>85%).

Preference is given to conducting the process according to the invention without use of an active metal-containing catalyst.

The process according to the invention enables preparation of synthesis gas from hydrocarbons, especially from methane, without release, or with very minor release, of carbon dioxide into the atmosphere. At the same time, the process allows operation of existing or newly constructed hard coal and brown coal power plants substantially without emission of pollutants, which should considerably increase public acceptance thereof. Furthermore, it is possible to use a hard coal and brown coal power plant in a much more flexible manner than is possible according to the prior art, according to which it serves merely to cover the base load of electrical energy, since it is operated with constant power and it is possible to utilize electrical energy which cannot be sold off to the public power grid for the synthesis gas production.

BRIEF DESCRIPTION OF THE DRAWINGS

Further details and advantages of the invention will be illustrated by the description hereinafter of an exemplary embodiment shown in the FIGURE, wherein:

FIG. 1 illustrates a working example of the invention.

FIG. 1 shows a preferred configuration of the process according to the invention, in which synthesis gas is produced using a reactor wherein a moving bed composed of a solid granular material is conducted through the reaction space thereof which comprises a first and a second reaction zone.

Via the feed 1, a solid granular material, which is, for example, carbon produced by thermal hydrocarbon decomposition in the process, is introduced at ambient temperature from the top into the reaction space R of the reactor K, through which it is subsequently conducted downward in a moving bed W under the action of gravity. A hydrocarbon-containing input gas 2 which is preferably natural gas is simultaneously passed into the reaction space R from the bottom and conducted upward through the moving bed W in countercurrent. The input gas 2 which is at ambient temperature on entry into the reaction space R is heated up on its way upward by direct heat exchange with the moving bed W until it reaches the decomposition temperature of the hydrocarbon in the first reaction zone Z1. Under these conditions, the hydrocarbons decompose in an endothermic reaction to produce hydrogen and carbon. The carbon formed here is predominantly deposited on the solid granular material of the moving bed W. Together with unconverted or only incompletely converted hydrocarbon, the hot hydrogen formed flows into the second reaction zone Z2 which is disposed above the first reaction zone Z1. As the hydrogen and hydrocarbons flow through the second reaction zone Z2, they are heated up further by direct heat exchange with the moving bed W. In the second reaction zone Z2, a portion of the hydrogen is combusted with oxygen which is fed in via line 3, and thus provides the heat of reaction required for the synthesis gas production. Alternatively or additionally, the heat of reaction can also be introduced into the reaction zone Z2 by means of electrical power 17. At least a further portion of the hydrogen is reacted with carbon dioxide supplied via line 4 to give water and carbon monoxide. Hydrocarbon feedstock, undecomposed or incompletely decomposed in the first reaction zone Z1, is reformed in the second reaction zone Z2 with water to produce hydrogen and carbon monoxide. As a result, a synthesis gas flows out of the second reaction zone Z2 and is cooled in countercurrent with the moving bed W and is drawn off at the upper end of the reactor K via line 5 with a temperature of about 50 to 500° C. Subsequently, the synthesis gas 5 is fed to the synthesis unit S, where it is converted to products 13 such as methanol, dimethyl ether or hydrocarbons. Any residual gas 20 which comprises hydrocarbons and is obtained in the synthesis unit S is recycled into the reactor K in order to likewise thermally decompose the hydrocarbons.

At the lower end of the reactor K, solid granular material 6 is drawn off at a temperature close to ambient temperature and is fed to a processing unit A, in order to process it by removal of the carbon deposited in the first reaction zone Z1 and then to recycle it back into the reaction space R via line 7. The carbon 8 removed is fed to the power plant D, where it is combusted with an oxidizing agent 9 which is air or oxygen-enriched air or oxygen of technical grade purity for production of power 10, of which between 0% and 100% is fed into the public grid according to demand. Power 17 not fed into the public grid is used for providing the heat of reaction for the reactions that proceed in the second reaction zone Z2. For removal of carbon dioxide, the carbon dioxide-containing flue gas 11 that forms in the combustion is fed to a removal unit B which is, for example, an amine scrubbing operation, the operation of which is facilitated by a portion 18 of the waste heat 12 from the synthesis unit S. Another portion 19 of the waste heat 12 is fed to the power plant D where it is utilized to raise steam for power production. A portion 4 of the carbon dioxide 14 removed is subsequently conducted into the second reaction zone Z2, while the remainder 15 is added to the oxidizing agent 9, such that any residual gas 16 obtained can be released to the atmosphere in substantially carbon dioxide-free form.

Depending on the way in which the thermal energy required for the synthesis gas production is provided, different mass balances arise. In order, however, to be able to always operate both the thermal carbon 8 decomposition and the oxidation of the carbon 8 and the scrubbing of the carbon dioxide-containing gas mixture 11 produced under constant conditions, it is proposed that carbon 21 not utilizable at that time and non-utilizable carbon dioxide 22 be stored intermediately and be fed back to the operation as required. Preferably, carbon dioxide 22 is stored intermediately here in liquid form.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European patent application EP 14002871.3, filed Aug. 19, 2014, are incorporated by reference herein.

The invention claimed is:

1. A process for producing synthesis gas, said process comprising:
   subjecting a hydrocarbon feedstock containing methane to thermal decomposition to obtain carbon and hydrogen, using at least a portion of the carbon obtained by said thermal decomposition as fuel in a power plant operation to produce electrical power wherein said at least a portion of the carbon is combusted to produce a carbon dioxide-containing flue gas, subjecting the carbon dioxide-containing flue gas to a chemical and/or physical gas scrubbing operation to yield carbon dioxide and a residual gas, reacting at least a portion of the hydrogen obtained by said thermal decomposition with at least a portion of the obtained carbon dioxide obtained from said scrubbing operation in a reverse water-gas shift reaction to produce a synthesis gas containing carbon monoxide and water, and converting said synthesis gas to methanol and/or dimethyl ether and/or hydrocarbons wherein waste heat is generated, and using at least a portion of the waste heat generated in the conversion of said synthesis gas in said scrubbing operation, wherein the thermal decomposition is conducted in the presence of a solid granular material, wherein the thermal energy required for synthesis gas production is generated by oxidation or partial oxidation of a fuel comprising hydrocarbons and/or hydrogen and/or by electrical power.

2. The process according to claim 1, wherein a portion of the waste heat (12) generated in the conversion of said synthesis gas is used in a power plant operation for production of electrical power.

3. The process according to claim 1, wherein said thermal decomposition is conducted in a first reaction zone (Z1) and hydrogen formed during said thermal decomposition is passed out of the first reaction zone (Z1) into a second reaction zone (Z2) where said hydrogen is reacted with carbon dioxide in said reverse water-gas shift reaction to produce water and carbon monoxide.

4. The process according to claim 3, wherein energy required for said thermal decomposition in said first reaction zone (Z1) is supplied from said second reaction zone (Z2).

5. The process according to claim 3, wherein hydrocarbon material that is undecomposed or incompletely decomposed in said first reaction zone (Z1) is passed into said second reaction zone (Z2) and reacted therein with water to produce hydrogen and carbon dioxide.

6. The process according to claim 3, wherein said first reaction zone (Z1) and said second reaction zone (Z2) are connected by means of a moving bed (W) containing said solid granular material and said moving bed moves from said second reaction zone (Z2) to said first reaction zone (Z1).

7. The process according to claim 6, wherein gas discharged from said second reaction zone (Z2) is conducted in countercurrent flow to said moving bed (W) and is cooled down by direct heat exchange with said moving bed.

8. The process according to claim 6, wherein said hydrocarbon material (2) is conducted through said first reaction zone (Z1) in countercurrent to said moving bed (W) and said hydrocarbon material (2) is heated up by direct heat exchange with said moving bed.

9. The process according to claim 6, wherein carbon deposited on said solid granular material is separated (A) downstream of said first reaction zone (Z1) and removed from said moving bed (W).

10. The process according to claim 6, wherein said solid granular materials comprises corundum ($Al_2O_3$), quartz glass ($SiO_2$), mullite ($Al_2O_3 \cdot SiO_2$), cordierite ($(Mg,Fe)_2(Al_2Si)[Al_2Si_4O_{18}]$), steatite ($SiO_2 \cdot MgO \cdot Al_2O_3$), coal, coke or carbon produced in by thermal hydrocarbon decomposition, or combinations thereof.

11. The process according to claim 6, wherein said solid granular material is a carbon-rich granular material formed from solid grains having at least 95% by weight.

12. The process according to claim 11, wherein said solid grains have an equivalent diameter of 0.05 to 50 mm.

13. The process according to claim 6, wherein said solid granular material has a porosity of 0.1 to 0.85 ml/ml.

14. The process according to claim 6, wherein said solid granular material is macroporous and has a mean pore radius of 0.01 to 50 μm.

15. The process according to claim 6, wherein said solid granular material has a specific surface area of 0.02 to 100 $m^2/g$.

* * * * *